(12) United States Patent
Conte

(10) Patent No.: US 6,471,178 B1
(45) Date of Patent: Oct. 29, 2002

(54) DEVICE FOR ADJUSTING THE LENGTH OF A SUPPORT AND METHOD FOR PRODUCING SAME

(75) Inventor: Peter Del Conte, Ettenhausen (CH)

(73) Assignee: Cabex AG, Vaduz (LI)

( * ) Notice: Subject to any disclaimer, the term of this patent is extended or adjusted under 35 U.S.C. 154(b) by 0 days.

(21) Appl. No.: 09/230,276

(22) PCT Filed: May 15, 1998

(86) PCT No.: PCT/CH98/00205

§ 371 (c)(1),
(2), (4) Date: Mar. 22, 1999

(87) PCT Pub. No.: WO98/53221

PCT Pub. Date: Nov. 26, 1998

(30) Foreign Application Priority Data

May 21, 1997 (CH) .............................................. 1184/97
Jun. 18, 1997 (CH) .............................................. 1492/97

(51) Int. Cl.⁷ .............................................. F16H 13/00
(52) U.S. Cl. ...................................... 248/631; 248/161
(58) Field of Search ................................ 248/404, 161, 248/631, 669, 654, 162.1, 333, 575; 297/344.19, 344.18; 267/64.12, 64.26, 118

(56) References Cited

U.S. PATENT DOCUMENTS

| 3,787,019 | A | * | 1/1974 | Freitag ..................... 248/188.2 |
| 3,960,250 | A | | 6/1976 | Walter ......................... 188/281 |
| 4,844,392 | A | * | 7/1989 | Bauer et al. .............. 248/162.1 |
| 4,997,150 | A | * | 3/1991 | Mardollo ..................... 248/161 |
| 5,137,124 | A | * | 8/1992 | Wirges ........................ 188/282 |
| 5,284,312 | A | * | 2/1994 | Dony .......................... 248/161 |
| 5,806,828 | A | * | 9/1998 | Rothe et al. ................ 248/631 |

FOREIGN PATENT DOCUMENTS

| AT | 291773 | 6/1971 |
| DE | 1863053 | 11/1962 |
| DE | 29607993 | 8/1996 |
| FR | 2306377 | 10/1976 |
| GB | 2053413 | 2/1981 |
| GB | 29708798 | 7/1997 |

* cited by examiner

*Primary Examiner*—Anita King
*Assistant Examiner*—Gwendolyn Baxter
(74) *Attorney, Agent, or Firm*—Horst M. Kasper

(57) ABSTRACT

The invention relates to a device comprising a substantially tubular inner part (10) and a fluid-impermeable piston (4) stored therein. The base (41) of the piston (4) and a seal (70) form a unit.

31 Claims, 7 Drawing Sheets

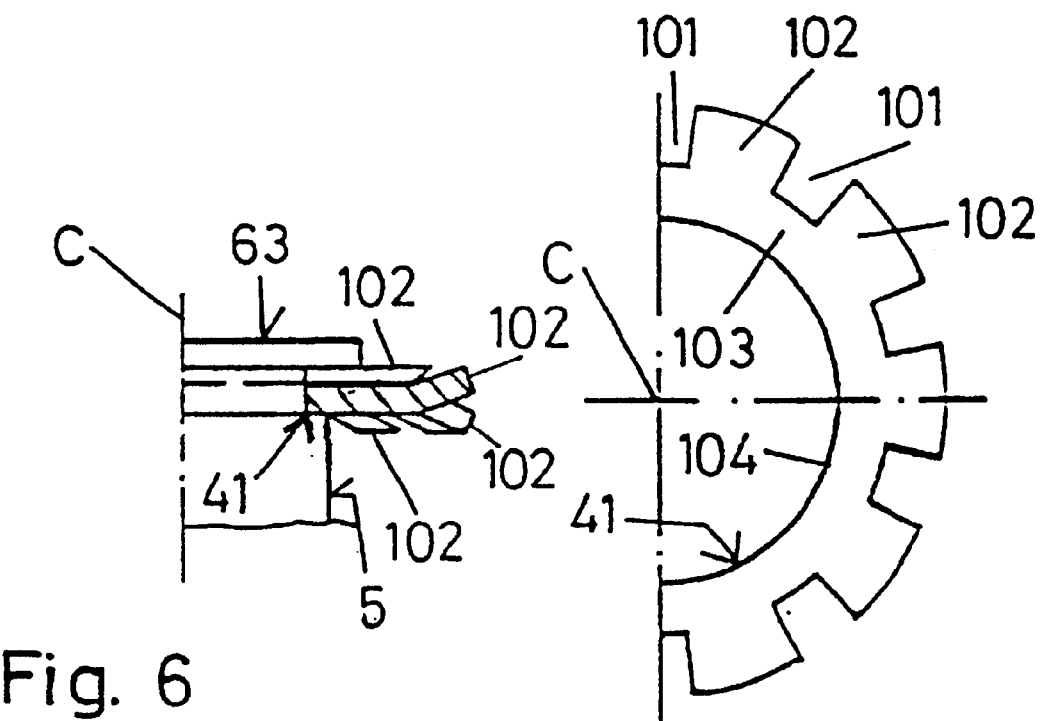

DEVICE FOR ADJUSTING THE LENGTH OF A SUPPORT AND METHOD FOR PRODUCING SAME

The present invention relates to an equipment for the adjustment of the length of a support, especially for chairs, tables or the like, with one essentially tubular interior part and with a piston which is supported in the interior part in a fluid tight manner, and a process for the manufacturing of this equipment.

An equipment of this type is already known. That end portion of a piston rod, which is placed in the interior of the casing of this equipment, has a circumferential step so that the end portion of the piston rod has the form of a pivot. The main body of the piston is put on said pivot, whereby this main body has the form of a flat ring. In the peripheral wall of the piston main body a circumferential groove is carried out, in which a first sealing ring lies. This ring seals in a fluid tight manner the gap between the piston main body and the inside wall of the casing. In the cylindrical side wall of the pivot, a second groove is carried out in which a second sealing ring is placed. This second ring seals in a fluid tight manner the gap between the side wall of the pivot and the side wall of the opening in the piston main body.

Among other things the fact is regarded as disadvantageous of this known construction of the prior equipment that the piston arrangement consists of several components which must be assembled during the manufacturing of this equipment.

The object of the present invention is to eliminate these and further disadvantages of the prior art.

This object is achieved according to the present invention in the case of the equipment of the generic type mentioned in the introduction as defined in the characterising part of the patent claim 1.

A process for the manufacturing of this equipment is according to the present invention defined in the characterising part of the patent claim 10.

Figure 1:
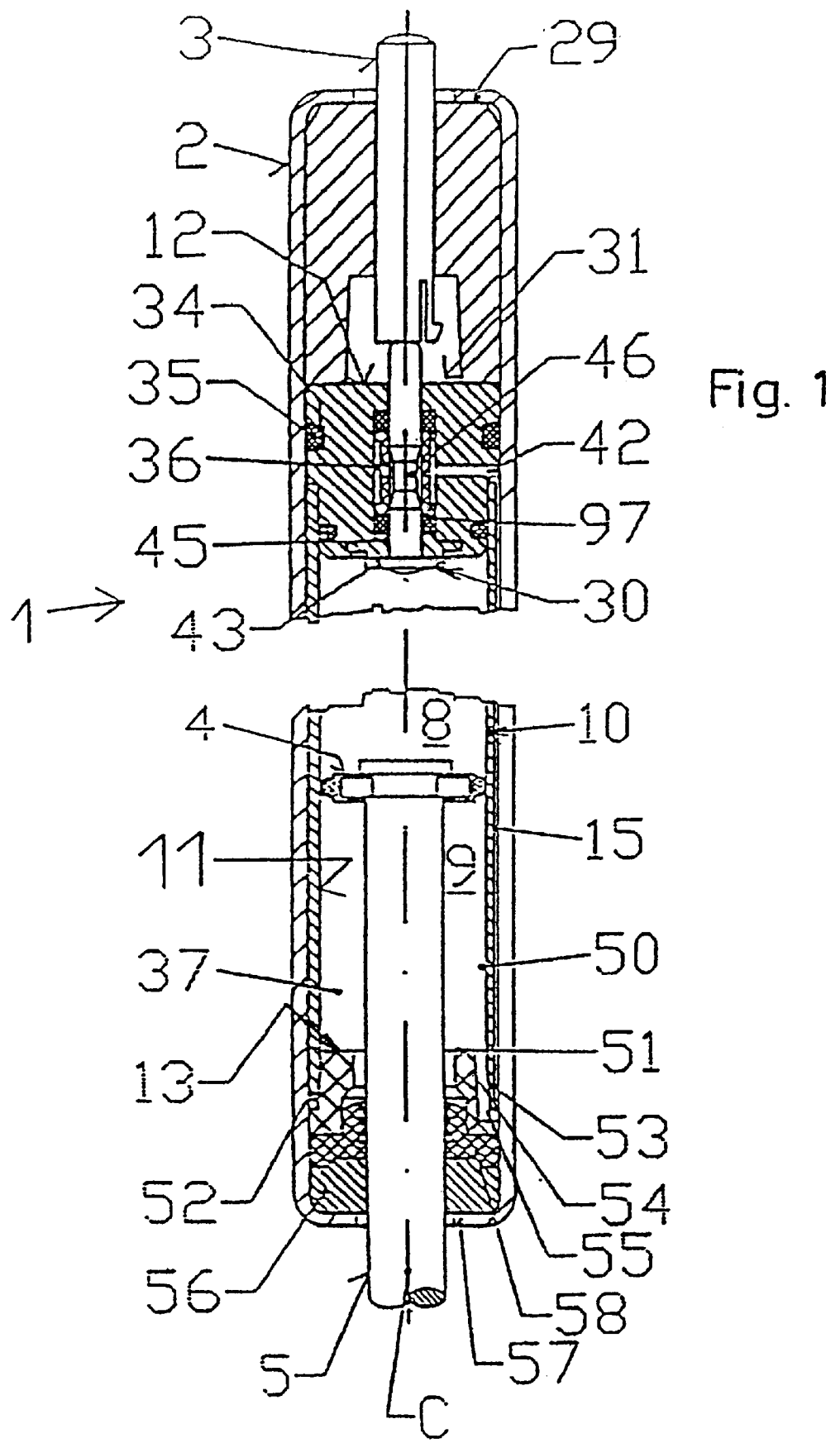
Figure 2:
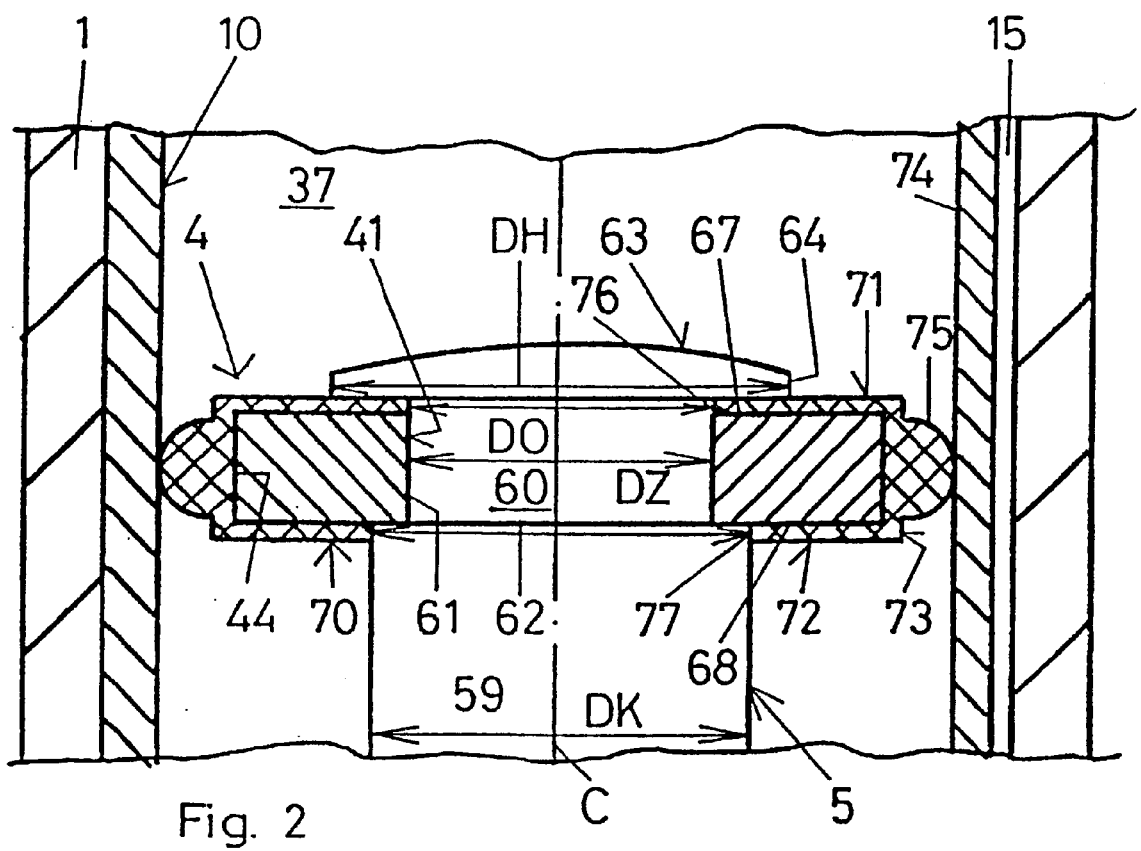
Figure 3:
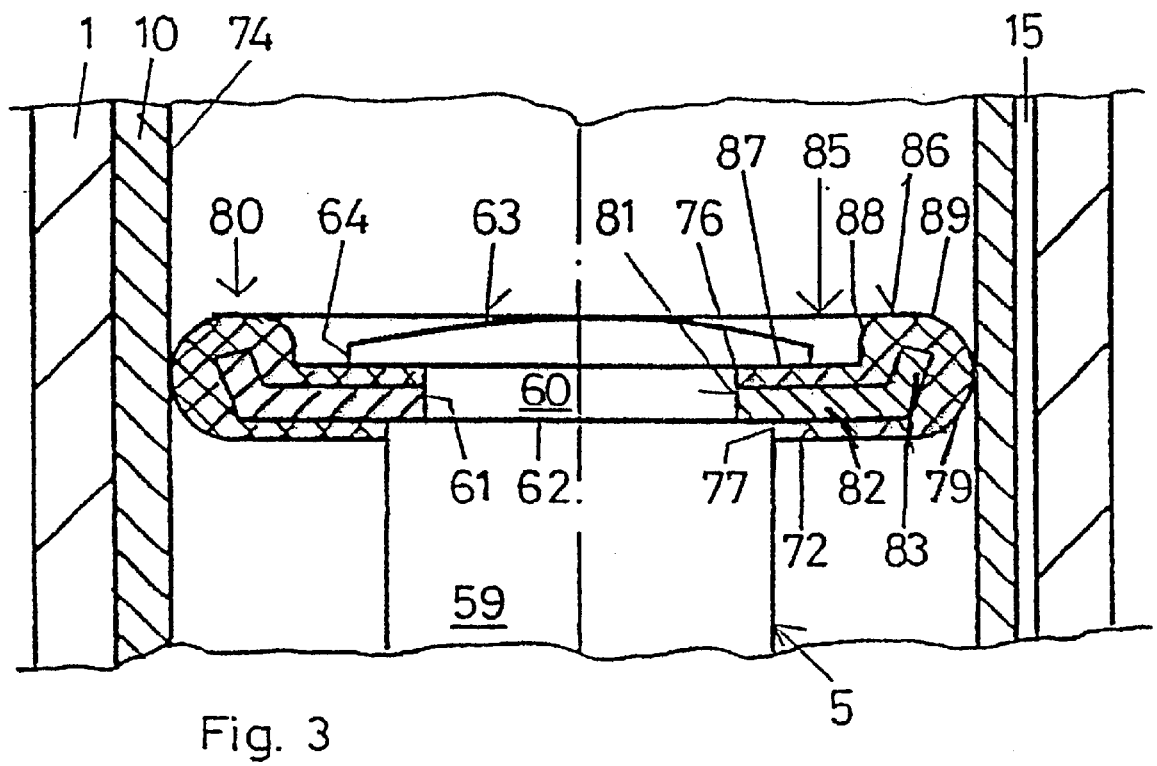
Figure 4:
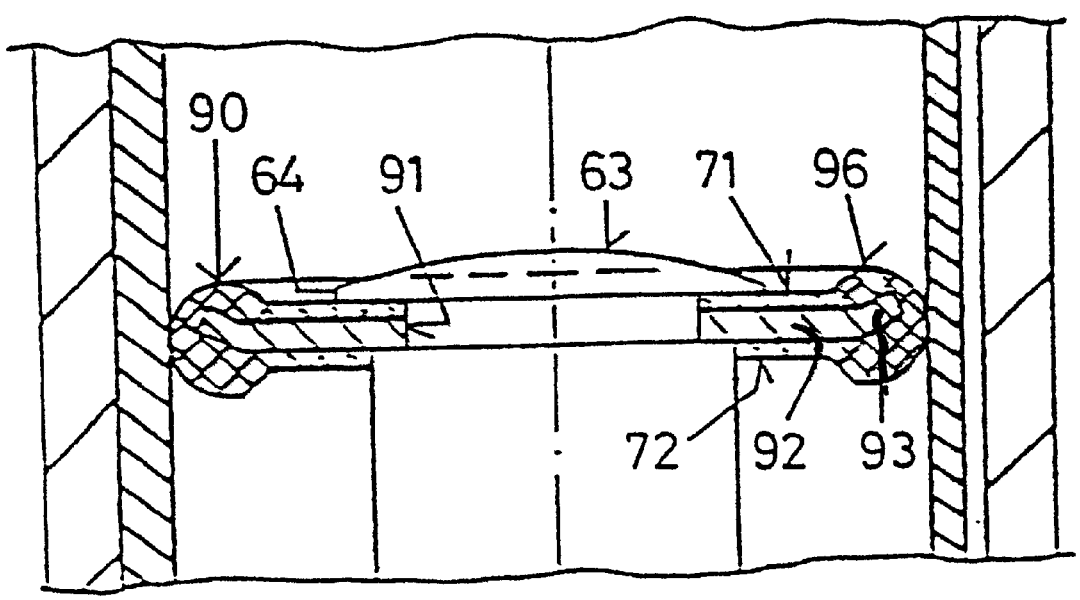
Figure 7:
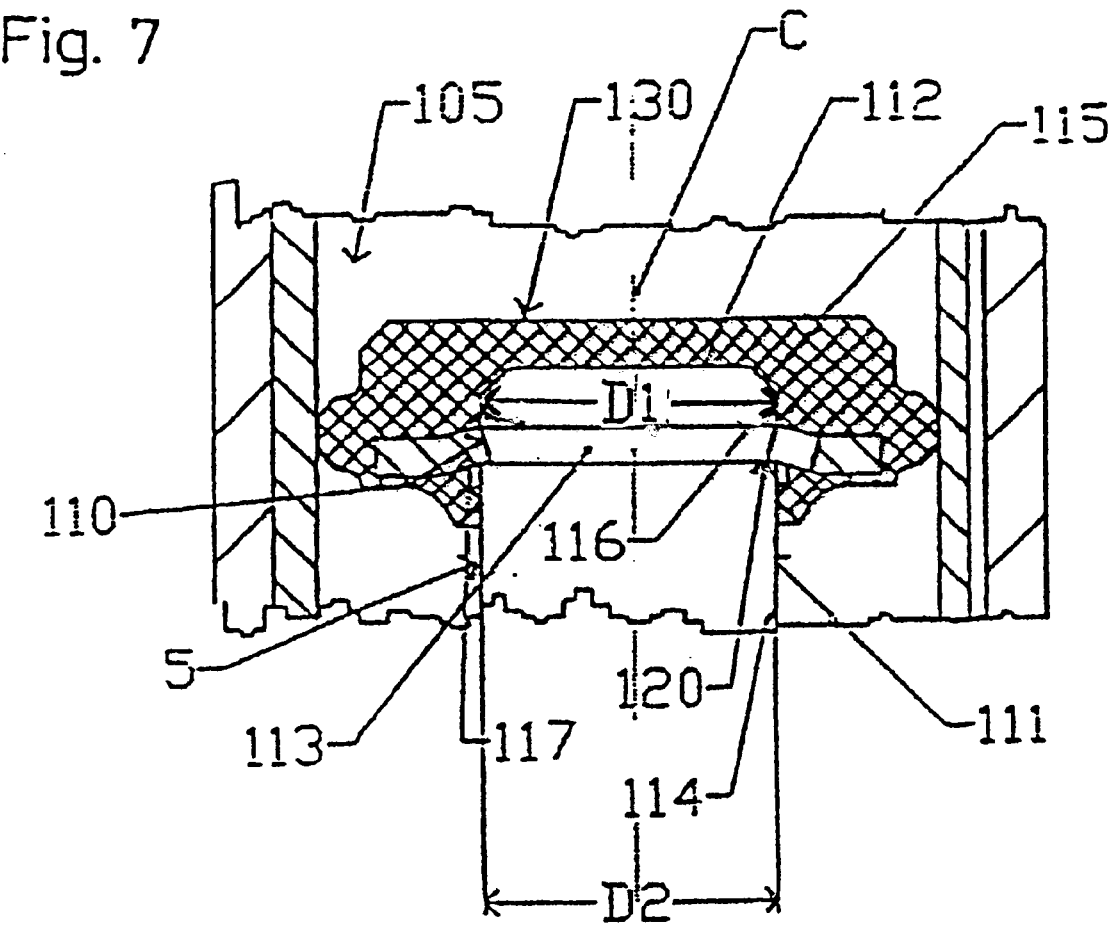
Figure 8:
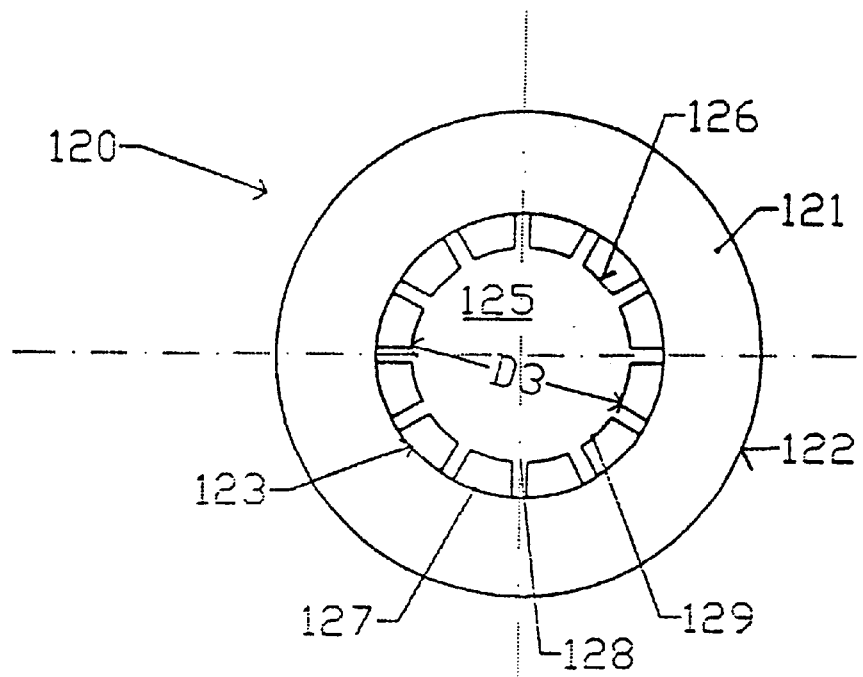
Figure 9:
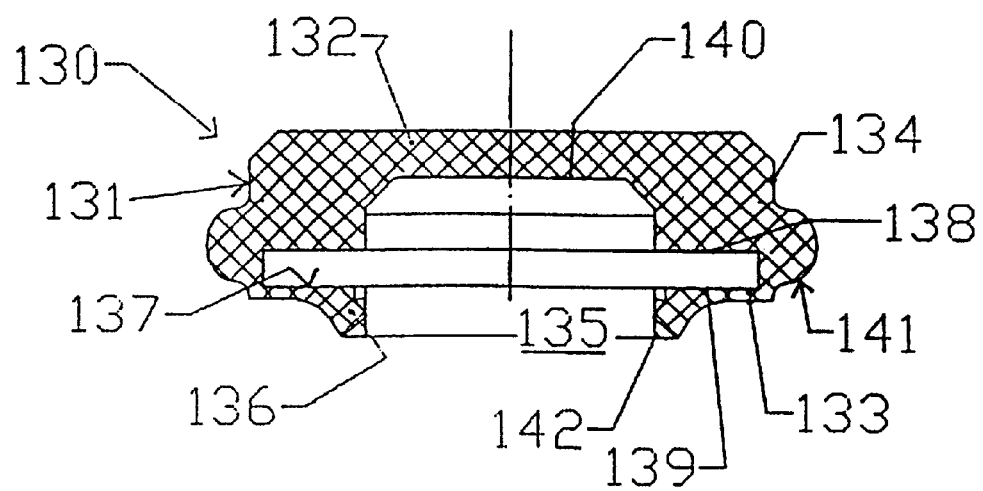

Below, implementation forms of the present invention are explained on the basis of the enclosed drawings in more detail. It shows:

FIG. 1 in a vertical longitudinal cut a first implementation form of the present equipment which has a tubular interior part whereby a piston is placed in this interior part, FIG. 2 in a vertical longitudinal cut and increased a detail from FIG. 1 which shows first of all said piston, FIGS. 3 to 5 in a vertical longitudinal cut and increased further implementation possibilities of the piston, FIG. 6 in a front view a detail from the main body of the piston as shown in FIG. 5, FIG. 7 in a vertical longitudinal cut and increased a detail from another implementation form of the present equipment whereby here is shown first of all the piston, which has an annular insert embedded in a seal, FIG. 8 in a plan view the insert from FIG. 7 and FIG. 9 in a vertical cut the seal from FIG. 7.

The present equipment is executed as a fluid spring. This can be a gas or a hydraulic spring, for example, whereby such springs or supports are generally known. The length of such an equipment can be changed and locked in a known manner.

The present equipment shows a casing 1 (FIG. 1) which is below called also outer part of this equipment. The main body 2 of this outer part 1 is essentially cylinder shaped, tubular shaped respectively. On the upper section of the casing 1 the seat of a chair, the plate of a table or the like can be placed. For actuating the equipment a plunger 3 of a known kind sticks out axial from the upper front surface of the main body 2 of this equipment. Further, the present equipment includes an interior part 10 having an essentially cylindrical, tubular resp. main body 11. This is placed or put in the outer part 1.

In a cavity 37 of the interior part 10 a piston 4 is placed which is secured to one end of a rod 5. This piston 4 divides the hollow area 37 in the interior part 10 into two part areas 8 and 9 whereby one of these part areas 8 or 9 is arranged on one side of the piston 4. The piston 4 is movable in the interior part 10 and it is supported fluid tight in the interior part 10.

End pieces 12 and 13 are assigned to the end portions of the main body 11 of the interior part 10. One of the end pieces 12 is provided with a valve arrangement 30 of a per se known kind. This arrangement 30 controls the flow of the fluid between said part areas 8 and 9. Through the second or other end piece 13 the piston rod 5 passes and this rod 5 protrudes or sticks out from the lower or opposite end portion of the spring casing 1. That end portion of the piston rod 5 which protrudes from the casing 1 is assigned to the ground plate of a leading tube (not shown) which is secured in the foot of a chair, of a table or the like.

The outer surface of the interior part 10, made of steel, lies with a clearance on the interior surface of the outer part 1 and a by-pass channel 15 is placed between the outer part 1 and the interior part 10. Each one of the orifices of this channel 15 lies in the region of one of the already mentioned end pieces 12, 13 resp. of this equipment. In the present case, the by-pass channel 15 is carried out in the outer surface of the main body 11 of the interior part 10 and it has the form of a furrow or of a groove. The fourth wall of this channel 15 is formed by that section of the interior surface of the outer part 1 which lies over this channel 15.

The end piece 12 shows an essentially tubular shaped main body 31. One of the end portions of this main body 31 is put in one of the end portions of the tubular main body 11 of the interior part 10. A flanged edge 29 of the outer part 1 lies on the other end of the tubular main body 31. In the peripheral surface of the respective end portion of the main body 31 of the end piece 12 a circular groove 34 is carried out in which a sealing ring 35 lies.

The essentially cylindrical inside surface of the tubular main body 31 of the end piece 12 defines an interior space 36 in this main body 31, one end of which opens into the cavity 37 in the interior part 10. Crosswise through the wall of the tubular main body 31 a channel 42 extends which connects the interior space 36 in the end piece 12 with one end of the by-pass channel 15 in term of fluid. The diameter of this connecting channel 42 can be so rated that this channel 42 can throttle the flow of the fluid 42 between the part areas 8 and 9 of the interior part 10.

The valve arrangement 30 includes among other things also a pressing body 43, which is connected to that end portion of the plunger 3 which is placed in the cavity 37 of the interior part 10. In that region of the main body 31 of the end piece, which faces the cavity 37, an intermediate piece 45 made of a stiff material is put. One side of this intermediate piece 45 lies on a seal 97 which is also placed in the interior space 36 of the end piece. The plunger 3 goes through the sealing ring 97 as well as through the intermediate piece 45.

The plunger 3 shows a narrowed section 46 the diameter of which is smaller than the diameter of the main body of the plunger 3. If the plunger 3 is in its unactuated condition, i.e. if the plunger 3 is in its upper position, then the narrowing 46 on the plunger 3 is in that area of the end piece 12 where the connection channel 42 is also placed. In the course of the actuating of the equipment, the plunger 3 is moved so far downwards until the narrowing 46 reaches the area of the lower sealing ring 97 and bridges them. At the same time, the pressing body 43 is lifted up from the low front area of the intermediate piece 45. The fluid can now stream between the connection channel 42 and the hollow space 37 of the interior part 10.

The second end piece 13 of this equipment is assigned to the opposite end portion 10 of the interior part 10. This end piece 13 includes an essentially tubular shaped main body 51 through which the piston rod 5 passes under leaving a clearance free. In that edge portion of the outer surface of the main body 51, which faces the cavity 37 in the interior part 10, a circular step 52 is carried out in the outer area of the main body 31. The diameter of this step 52 corresponds to the inside diameter of the end portion 50 of the interior part 10 and this edge portion 52 of the main body 51 is put into the end portion 50 of the interior part 10.

In the main body 51 of the end piece 13 a connection channel 53 is carried out. This connection channel 53 includes a first section 54, which is placed in the wall of the step 52 in the main body 51 and which extends to the longitudinal axis C of the equipment parallel or nearly parallel. One of the end portions of this first channel section 54 leads into the hollow space 37 of the interior part 10. The connecting channel 53 further includes a second section 55 one end of which is connected to the first channel section 54. The other end of this second channel section 55 lies in the peripheral area of the main body 51 of this end piece 13. This end of the channel opposes that orifice of the by-pass channel 15 which is placed here. Consequently, the fluid can flow in fact through the connection channel 53 between the interior 37 of the interior part 10 and the by-pass channel 15.

This end piece 13 includes also an annular supporting plate 56 through which the piston rod 5 passes. On the outer edge of this supporting plate 56 a flanged edge 57 lies which belongs to the here lying end portion of the outer part 1. Between the supporting plate 56 and the main body 51 of this end piece 13 an annular seal 58 made of a plastic material is placed through which the piston rod 5 also passes. This sealing ring 58 is squeezed between the main body 51 and the supporting plate 56. Consequently, the sealing ring 58 lies fluid tight on the piston rod 5 on the one hand and on the interior wall of the casing 1 on the other hand.

FIG. 2 is an increased detail from FIG. 1 and it shows among other things that end portion of the piston rod 5 which carries the piston 4. That one end portion of the piston rod 5, which is in the cavity 37, is provided with a circular step. The cross section of this step comprises a first or longitudinal flank 61 which extends parallel to the longitudinal axis C and a second or perpendicular flank or shoulder 62 which extends perpendicular to the longitudinal axis C. The longitudinal flank 61 forms the peripheral wall of a pivot 60 which axially protrudes from the main body 59 of the piston rod 5 and which is in one piece with this rod main body 59. The diameter DZ of this pivot 60 is smaller than the diameter DK of the main body 59 of the piston rod 5. The length or the height of the pivot 60 corresponds to the height or to the thickness of the piston 4. A plate 63 is assigned to the front surface of the pivot 60. This plate 63 has a practically circular peripheral wall 64 and it is secured in the region of the front area of the pivot 60 secured in a per se known manner. This plate 63 is fortified in the area of the front head surface of the pivot in a known manner. The diameter DH of the peripheral wall 64 of this plate 63 is advantageously somewhat bigger than the diameter DK of the main body 59 of the piston rod 5.

The piston 4 shows a flat main body 41 which has the form of a flat ring and which is of a stiff material, advantageously of metal. The large surfaces 67 and 68 of this annular main body 41 are flat in the embodiments according to FIGS. 1 and 2. The diameter of the middle opening 104 (FIG. 5) in the ring body 41 is rated so that this diameter is practically the same as the diameter DZ of the pivot 60. Consequently, the annular body 41 can be put on the pivot 60 so that the inside surface of the middle opening 104 in the ring body 41 lies on the side surface 61 of the pivot 60. That edge section of the middle opening in the annular shaped body 41, which is placed in the lower large surface 68, is secured to the shoulder 62 of the piston rod 5 directly and firmly. This guarantees that the piston 4 remains in his position perpendicularly to the longitudinal axis C of this equipment also during the operation of this equipment.

The already mentioned plate 63 faces the upper large surface 67 of the ring body 41 whereby its peripheral edge section,which encompasses the peripheral wall 64, is situated above the upper edge part of the middle opening in the ring body 41. The plate 63 holds the piston 4 at place. Instead of this plate 63 the pivot 60 can be made somewhat longer so that an end section of the same projects from the piston 4 above after the piston has been put onto the pivot 60 This final section of the pivot 60 is reshaped, for example by blanks, for mounting of the piston, so that the pivot forms a head 63. The peripheral part 64 lies on the upper edge of the middle opening in the piston main body 41 or in a distance above.

Furthermore, the piston 4 has a seal 70 which has the form of a flat and hollow ring. This hollow ring 70 has among other things two parallel to each other extending and perpendicula to the wall 74 standing walls 71 and 72. Each of these walls 71 and 72 has the form of a flat annular, whereby these rings are placed in a distance to each other. The outer edges of these ring walls 71 and 72 are connected to each other by means of a peripheral wall 73. This wall 73 stands perpendicular to the annular walls 71 and 72 and its is in one piece with them. The peripheral wall 73 extends parallel to the wall 74 of the interior part 10. The cavity in this sealing ring 70 is open in the region of the edges 76 and 77 of the walls 71 and 72 which define the middle opening in this sealing ring 70.

If one looks at only one-half of the sealing ring 70, this ring half has an essentially U shaped cross section. A cut through the large walls 71 and 72 of this ring half represents the shanks of a U form and a cut through the peripheral wall 73 forms the bridge of this U form. In the case depicted in FIG. 2, the outer diameter of the bridge wall 73 is somewhat smaller than the diameter of the inside wall 74 of the interior part 10 so that the outer area of the bridge wall 73 is situated in a distance from the inside surface 74 of the interior part 10. At the outer side of the bridge wall 73 a circular and radially situated bulge 75 is formed, which has an outer surface. Said bulge 75 is turned away from the bridge wall 73 and it is rounded. The outer diameter of the round surface of the bulge 75 is so rated that this bulge round surface lies on the inside surface 74 of the interior part 10 in a fluid tight manner and that it is nevertheless alongside movable.

The diameter D0 of the upper interior circular edge 76 and the diameter DU of the lower interior circular edge 77 of the ring walls 71 and 72 of the sealing ring 70 are different so that these circular edges 76 and 77 stand in different distances from the axis C of this equipment. The diameter DO of the interior circular edge 76 of the upper ring wall 71 corresponds to the diameter DZ of the pivot 60 so that this ring wall 71 reaches up to the pivot 60. The diameter DU of the inner circular edge 77 of the lower ring wall 72 is somewhat smaller than the diameter DK of the piston rod 5. This lower ring wall 72 extends consequently up to the main body 59 of the piston rod 5. The circular edge 76 of the upper ring wall 71 lies nearer to the axis C than the circular edge 77 of the lower ring wall 72. Consequently, the upper ring wall 71 is bigger than the lower ring wall 72.

Such a sealing or hollow ring 70 is assigned to the piston main body 41 so that it surrounds the outer edge part of the piston main body 41 and that it extends from here against the middle of the piston main body of 41, against the axis C respectively. The interior circular edge 77 of the lower wall 72 of the hollow sealing ring 70 lies in the area of the outer wall of the main body 59 of the piston rod 5. The upper wall 71 of the hollow ring 70 extends somewhat further in the direction to the middle axis C. As the diameter DH of the head 63 is bigger than the diameter DZ, DK respectively, the outer edge part of the hold head 63 overlaps the inner edge part of the upper wall 71 of the sealing ring 70, which reaches up to the pivot 60.

The height of the pivot 60 is rated under the consideration of the thickness of the main body 41 of the piston 4 and the thickness of the upper wall 71 of the sealing ring 70 so that that edge region of the upper wall 71 of the seal, which comprises the interior edge 76, is wedged between the upper side of the interior lying edge of the main body 41 of the piston 4 and the lower side of the outer edge of the head or of the holding plate 63. The value of the wedge force is to be chosen so that the gap between the piston main body 41 and the piston rod 5 is fluid tight.

The sealing ring 70 is held on the piston main body 41 in two manners, consequently. First, this is a closing shape-form end, which is caused by the fact that the walls 71 to 73 of the hollow sealing ring 70 suround the piston main body 41 and lie strongly thereon. Furthermore, the holding of the sealing ring 70 is caused by the wedging or squeezing of the interior lying edge part of the upper wall 71 of the sealing ring between the piston main body 41 and the hold head 63.

The piston main body 4 is preferably made of metal. The body 4 is provided with a coat of an elastic material, for example with a plastic, manufactured by spraying. The elastic material forms the seal 70 on the piston main body 41 after said spraying.

This piston 4 can be called as made in one piece. This therefore, because it shows only a sole seal 70 which is solidly mounted on the piston main body 41. The assembly of the present equipment is under the application of such a piston simpler than until now.

FIG. 3 shows another implementation form of the piston 80 of the present equipment. The main body 81 of this piston 80 has the form of a dish, of a flat bowl with a bottom 82 and a wall 83. In the middle area of the bottom 82 is an opening through which the pivot 60 of the piston rod pole 5 goes through in the already described manner. The wall 83 of the piston main body 81 stands to the named bottom 82 practically rectangularly, so that it extends parallel to the inside wall 74 of the interior part 10.

The sealing ring 85 of this piston 80 is like, as it is described in the foregoing case, hollow. This sealing ring 85 shows the lower ring wall 72 and as well as the upper ring wall 86 which were already described. The cross section of this upper ring wall 86 is in the essential Z shaped. The respective leg 87, 88 and 89 of this Z form lie on the respective section of the upper side of the piston main body 81. The first or lower leg 87 of the Z form represents a cut through the lower section of the ring upper wall 86 which lies on the upper side of the bottom 82 of the bowl. This wall section 87 shows in that region which faces the pivott 60 that ring edge 76 which was already described. The lower edge part of the connecting leg 88 of the Z form is connected with the outer edge part of the lower ring wall section 87. This connection leg 88 which extends practically parallel to the axis C represents a cut through the connection section of the ring wall 86. This connection wall 88 extends parallel to the main axis C and it lies on the inside of the bowl wall 83.

To the upper edge of the connecting leg 88, which represents a cut through the upper section of the ring wall 86, the upper Z leg 89 is connected. The lower wall section 87 and this upper wall section 89 of the upper ring wall 85 extend parallel to each other as well as to the bottom 82 of the piston main body 81. The upper ring wall section 89 is assigned to the upper front area of the bowl wall 83.

The outer edge of the upper wall section 89 and the outer edge of the lower ring wall 72 are connected together by means of a peripheral wall 79. That outer area of this peripheral wall 79, which lies on the inside wall 74 of the interior part 10, is shaped convex. Because of the upright wall 83 of the piston main body 81 the peripheral wall 79 of the present sealing ring 85 has a considerable height, which is hihger than the height of the peripheral wall 73 of the piston 4 described in the foregoing. Consequently, this peripheral wall 79 can be everywhere equally thick. The plate shaped piston main body 81 can also for this reason be more advantageous in the course of the manufacturing of the flat annular piston main body 41 described in the foregoing.

FIG. 4 shows still another implementation possibility of the piston 90 of the present equipment. The main body 91 of this piston 90 is essentially plate or dish shaped and it shows a bottm 92 as well as a wall 93. The angle between the bottom 92 and the wall 93 ist bigger than 90 degrees and it is smaller than 180 degrees. This angle can amount to 120 degrees, for example. The wall 93 extends in sloping manner, i.e. diagonally outside away from the bottom 92 of the main body 91 of the piston 91, consequently. This piston main body 91 is surrounded by a hollow sealing ring 95 in the manner which was already been described. The outer edges of the upper ring wall 71 and of the lower ring wall 72 are connected together by means of a peripheral wall 96 of this sealing ring. Said peripheral wall 96 is carried out as a material conglomeration or thickening of this sealing ring. This thickening 96 can have a circle round cross section.

The outer edge part 44 of the main body 41, 81 and 91 of the piston 4, 80 as well as 90 can have a continuos outer edge which extends over the whole periphery of the main body 41. It is however also possible, that the outer edge part of the piston main body 41 is provided with radial extending proceeding cuts 101 (FIG. 5) which are placed along the periphery of the main body in distances of each other. Between two neighbouring cuts 101*a* segment 102 exists which extends in radial direction. These segments 102 are devided approximately fanlike on the circular shaped middle section 103 of the piston main body 41. The material of the sealing ring 70, 85 as well as 95 lies with such a piston not only on the large surface of the segments 102 but also in the gaps 101 between the neighboring segments 102. It understands itself that the material of the sealing ring is placed in front of the outer and front areas of the segments 102 (not shown) which forms the peripheral wall, e.g. the peripheral wall 96, of the sealing ring.

FIG. 6 shows a further development of the piston main body 41 which is shown in FIG. 5. With this implementation possibility, the fanlike arranged segments 102 of the piston main body 41 are interlaced (or twisted). This means that one of the segments are bent out to one side of the middle section 103 of the piston main body 41 while the directly neighbouring segments are bent out to the opposite side of the middle section 103, for example.

FIG. 7 shows in a vertical longitudinal cut and increased a detail from a further implementation form of the present equipment. In FIG. 7 is shown first of all that end portion of the piston rod 5 which bears the piston 105. The piston 105 is secured on the piston rod 5 by aid of a spring arrangement. For the mounting of the piston 105 a circular groove 110 is carried out in that end portion of the main body 111 of the piston rod 5 which is assigned to the piston 105. This groove 110 is placed in a distance of the front surface 112 of the end section of the piston rod 5. The edge of this end portion of the piston rod 5 is provided with a chamfer 115. This chamfer 115 surrounds the front surface 112 of this end section of the piston rod 5. Besides, it makes it easier, to put the piston 105 on the piston rod 5.

In principle, the circular groove 110 can have a U-shaped cross section. In the case which is depicted in FIG. 7 the groove 110 has an asymmetrical cross section 110, however. This means that the groove has a bottom 113 and only one side wall 117. The bottom 113 of the groove 110 stands under an angle alpha with respect to the longitudinal axis C of the piston rod 5 whereby this angle alpha is different from 0. This means that that edge part of the bottom 113 of the groove which faces the piston rod 5, lies deep in the interior of the main body 111 of the piston rod 5. Between this edge part of the bottom 113 of groove and the side wall 114 of the main body 111 of the piston rod 5 the side wall 117 of the groove 110 extends. This groove side wall 117 can stand to the groove bottom 113 rectangularly.

That edge of the diagonal extending bottom 113 of the groove, which faces the front surface 112 the piston rod 5, lies in the area of the peripheral surface 114 of the piston rod 5 or in that section 116 of the peripheral surface 114 of the piston rod main body 111 which is between the groove 110 and the chamfer 115 of the piston rod 5. That section of the piston rod 5, which lies between the groove 110 and the chamfer 115, can also be called as a head of the piston rod 5. At one of the implementations of this piston 105 the diameter D1 of the head 116 can be smaller than the diameter D2 of the main body 111 of the piston rod 5.

The piston 105 includes a flat and stiff insert 120 as well as a seal 130. The insert 120 is embedded in the seal 130 so that the middle part of the insert 120 is free as well as accessible 120 from one side of the seal 130.

The main body 121 of the insert 120 (FIG. 8) has the form of a flat ring which stands to the longitudinal axis C of the piston rod 5 practically rectangularly and which has an outer edge part 122 as well as an inner edge part 123. The contour of the outer edge part 122 is in that case, which is depicted in FIG. 8, circular. But this edge part 122 can also be structured in order to achieve a better connection between the outer edge part 122 of the insole 120 and the seal 130.

The interior edge part 123 of the insert 120 defines an opening 125 in which that end portions of the piston rod 5 is set which is assigned to the piston 5. The interior edge part 123 of the insert 120 is carried out as a spring. To this end it shows tongues 126 which stand away from the inside edge 127 of this edge part 123 and which are distributed along this inside edge side 127 side by side. The respective tongue 126 extends with respect to the main axis C in radial direction and it shows a plan which has the form of a ring sector. Between two neighbouring tongues 126 a gap or space 128 is present whereby these gaps 128 have practically the same width because of the said form of the plan of the tongues 126.

The tongues 126 are bent out from the plane of the main body 121 of the ring 120. The bending points of the tongues 126 lie in the area of the already mentioned inside edge 127 of the insert 120 is out bent 120. In the represented case, all tongues are 126 bent out in same direction from the plane of the ring main body 121, in fact so that the front surface 129 of the tongues 126 are nearer to the said front surface 112 than the main body 121 of the insert 120. At least those end portions of the tongues 126 lie in the circular groove 110 which comprises the front areas 129.

The diameter D3 between the front surface 129 of two opposite tongues 126 can be chosen so that the front surfaces 129 lie on the bottom 113 of the groove 110. In this case it is of advantage when the front faces 129 of the bent out tongues 126 from that angle alpha with the longitudinal axis C of the piston rod 5 which was already mentioned in connection with the inclination of the bottom 113 of the groove. If the side wall 117 of the groove 110 stands rectangularly to the ground 113 of the groove 110, as this has already been mentioned, then the underside of the respective tongue can 126 lie extensively on the side wall 117 of the groove. This increases that force which is effective against the fact that the tongues 126 are deflected in the case of an overload of the piston 105 and that the piston rod 5 runs through the insert 120 together with the seal 140 on the main body 111.

Another safety precaution can lie itherein, that the biggest diameter D1 of the rod head, which lies in the area of one part 116 of the wall of the rod head, is smaller than the diameter D2 of the side wall 114 of the main body 111 of the piston rod 5. The diameter D3 between the foront surfaces 129 of two each other diametrically opposite tongues 126 can in this case be so small that the insert can exactly be put up on the rod head 116. Such a diameter D3 is too small for the fact that the overloaded tongues could be bent out so far that the annular insert 120 can be put on the piston rod 5.

The seal 130 (FIG. 9) has an assembly disk shaped main body 131 which shows an upper front surface 132 and a lower front surface 133. Furthermore, the seal main body 131 shows an outer and essentially cylindrical side surface 134. Starting from the lower front surface 133 a deepening 135 is carried out in the seal main body 131. The diameter of the side wall 136 of this deepening 135 corresponds in the area of the orifice of said deepening 135 to the diameter D2 of the main body 111 of the piston rod 5. If the diameter D1 of the rod head is 116 smaller than the diameter D2 of the main body 111 of the piston rod 5, then the diameter of the side wall 136 can be in the area of the bottom 140 accordingly, so that the seal 130 sits strongly on the piston rod 5.

In the side wall 136 of the deepening 135 ia circular or ring shaped indentation 137 is carried out which serves for holding the insert 120. The indentation 137 has flat large surfaces 138 and 139 which lie on the large surfaces of the also annular insert 120. The large surface 138 and 139 of the indentation 137 can be flat because the main body 131 of the seal 130 is made of a yielding material. The form of the large surfaces 138 and 139 of the seal 130 fit the form of the tongues 126 of the insert 120 without all after the insert 120 was put up on the piston rodpole 5, on the rod head 116 respectively.

A circular or annular bulge 141 projects or stands away laterally or in the radial direction from the outer side wall 134 of the seal main body 131 stands 141 and this bulge 141 is in one piece with the seal main body 131. The peripheral part of the bulge 141 is carried out for a sealing seat on the inside surface of the interior part 10. For this purpose, the surface of the peripheral part of the bulge 141 has the form of a segment of a circle. A lip 142 extends upwardly from the lower front surface 133 of the seal main body 131. This lip 142 extends in the direction of the longitudinal axis C and it surrounds the orifice of the deepening 135 in the seal main body 131 so that the essentially tubular inside surface lies on the outer area 114 of the main body 111 of the piston rod 5.

The insert 120 can be made of a metal, for example of steel. If the insert 120 is not mounted, the tongues 126 can lie in the same plane as the main body 121 of the insert 120. Or the tongues 126 can be bent out from the plane of the main body 121 already in the not yet installed condition. This makes the installing of the piston 105 on the piston rod 5 more easily. The bent out tongues 126 act in the mounted condition as barbs so that the pistons 105 cannot be taken away of the piston pole 5. On the other hand, the diameter D1 of the head 116 on the piston rod 5 and the diameter D3 of the opening 15 in the insert 120 is so small that the piston 105 can not be further moved on the piston rod 5 if the equipment is overloaded.

The piston of this equipment can be manufactured so that the piston main body 4 is placed into a matrix (not shown) covering specified parts of the same. The not covered parts of the main body are covered with an elastic material, for example with a plastic, e.g. by spraying. After said material gets solid it represents the seal.

What is claimed is:

1. Equipment for an adjustment of a length of a support for chairs or tables, with one essentially tubular interior part and with a piston (4) which is supported in an interior part in a fluid tight manner, characterized in that a main body (41) of the piston (4) and a seal (70) on the piston form an unit,
    wherein the piston (4) shows a disk shaped main body (41) made of a stiff material, that an opening (104) exists in a middle area of this main body (41), that the seal (70) surrounds the outer edge part of the main body (41) and that the seal extends from the outer edge part away against the opening (104) in the piston main body (41),
    wherein the main body (41,81,91) of the piston is flat or has a form of a plate or disk or a flat bowl having a bottom (82, 92) and a wall (83, 93), that the wall (83) of the main body (81) of the piston stands practically rectangularly to the bottom (82) or that the wall (93) stands to the bottom (92) under an angle, which angle is larger than 90 degrees and smaller than 180 degrees.

2. Equipment for an adjustment of a length of a support for chairs or tables, with one essentially tubular interior part and with a piston (4) which is supported in an interior part in a fluid tight manner, characterized in that a main body (41) of the piston (4) and a seal (70) on the piston form an unit,
    wherein the piston (4) shows a disk shaped main body (41) made of a stiff material, that an opening (104) exists in the middle area of this main body (41), that the seal (70) surrounds the outer edge part of the main body (41) and that the seal extends from the outer edge part away against the opening (104) in the piston of the main body (41),
    wherein an outer edge part (44) of the main body (41) of the piston (4) is carried out as an outer edge which extends continuously over the whole periphery of the main body (41) or that radial extending cuts (101) are carried out in the outer edge part of the piston main body (41) which are placed along the periphery of the main body (41) in distances of each other, that a segment (102) is placed between neighboring cuts (101) whereby said segment extends in a radial direction, and that the material of a sealing ring (70, 85,95) lies not only on a large surface of the segment (102) but also in the cuts as well as gaps (101) between neighboring segments (102).

3. Equipment for an adjustment of a length of a support for chairs or tables, with one essentially tubular interior part and with a piston (4) which is supported in an interior part in a fluid tight manner, characterized in a main body (41) of the piston (4) and a seal (70) on the piston form an unit,
    wherein the piston (4) shows a disk shaped main body (41) made of a stiff material, an opening (104) exists in the middle area of this main body (41), that the seal (70) surrounds the outer edge part of the main body (41) and that the seal extends from the outer edge part away against the opening (104) in the main body (41) of said piston,
    wherein the seal (70) has a form of a hollow ring, that this hollow ring (70) includes an upper wall (71) lying on the main body of said piston as well as a low and at an underside of the main body of said piston lying wall (72), that these walls (71,72) extends at least essentially radial and at least essentially parallel to each other, that each of these walls (71,72) has the form of said ring, that the outer edges of these ring walls (71,72) are together interconnected by means of a peripheral wall (73) which is in one piece with the ring walls (71, 72), and that a cavity is open in such a sealing ring (70) in the area of the inner edges (76,77) of the ring walls (71,72).

4. Equipment for an adjustment of a length of a support for chairs or tables, with one essentially tubular interior part and with a piston (4) which is supported in an interior part in a fluid tight manner, characterized in that a main body (41) of the piston (4) and a seal (70) on the piston form an unit,
    wherein the piston (105) shows a stiff insert (120) having a form of a flat ring as well as a seal (130), that the insert is embedded in the seal so, that a middle part (125) of the insert (120) is free or accessible from a side of the seal (130), that the middle part (125) of an annular insert is executed springily and that the end portion (116) of the piston (105) assigned to the piston (105) is pocketed in the middle part (125) of an annular insole (120).

5. Equipment according to claim 4, characterized in the piston (4) shows a main body (41) Made of a stiff material, an opening (104) exists in the middle area of the main body (41), that the seal (70) surrounds the outer edge part of the main body (41) and that the seal extends from the outer edge part away against the opening (104) in the piston main body (41).

6. Equipment according to claim 5, characterized in the end portion of a piston rod, which is placed in a cavity (37) of an interior piece (10), is provided with a circular step, that a cross section of this step shows a first flank (61) which extend parallel to a longitudinal axis C of this equipment, that the cross section of said step shows a second flank (62) which extends to the longitudinal axis C perpendicular, that a longitudinal flank (61) of the step represents a peripheral wall of a pivot (60) which is axially aligned with the main body (59) of the piston rod (5) that a piston main body (41) is put up on said pivot (60), and that the edge part of the opening (104) in the piston main body (41) lies on said second flank or shoulder (62) of piston rod (5).

7. Equipment according to claim 4, characterized in an inner edge part (127) of the annular insole (120) is equipped with tongues (126) which are distributed along the inner edge part (127), that these tongues (126) stretch in radial direction of the annular insole (120) and that the tongues (126) can be placed at distances of each other.

8. Equipment according to claim 4, characterized in a circular groove (110) is carried out in that end portion of a piston rod (5) which is assigned to the piston (105), that the bottom (113) of this groove (110) stands under an angle alpha to a longitudinal axis C of the piston rod (5) which said angle alpha has a value different from zero, and that the free end portion of the tongues (126) lie in this groove (110).

9. Equipment for an adjustment of a length of a support having an essentially tubular interior part,
  having a piston (4) which is movable in the interior part in a fluid tight manner,
  the piston (4) comprising a main body (41) provided with a seal (70), whereby an opening (104) exists in the middle area of this main body (41) and,
  the piston (4) further comprising a piston rod (5), one end portion of the piston rod is provided with a circular step, so that a pivot (60) extends from the front end surface (62) of this end portion of the piston rod (5), whereby said pivot (60) is aligned with a longitudinal axis C of the main body (59) of the piston rod (5) and whereby the main body (41) of the piston (4) is put up on said pivot (60),
characterized in that
  the main body (41) of the piston (5) has the shape of a ring,
  that the seal (70) has a form of an essentially flat and hollow ring in which the main body (41) of the piston (5) is placed,
  that the cross section of one-half of the seal (70) has the shape of an U,
  that said hollow ring (70) includes an upper wall (71) and a lower wall (72) representing the legs or shanks of said U-shape,
  that ring shaped walls (71,72) of the seal (70) have the form of essentially flat rings extending at radial with respect to said longitudinal axis C and parallel to each other, so that the seal (70) surrounds the outer edge part of the main body (41) of the piston and extends from the outer edge part away against the opening (104) in the piston main body (41),
  that the outer edges of ring shaped walls (71,72) are together connected by means of a peripheral wall (73) which represents the bottom of said U-shape and which is in one piece with said ring shaped walls (71, 72) and
  that the outer surface (75,79) of this peripheral wall (73) is convex.

10. Equipment according to claim 9, characterized in a holding plate (63) is assigned to the front surface of the pivot (60), that this holding plate (63) has a practically circular peripheral wall (64) and is secured in the region of the front area of the pivot (60), that this holding plate (63) faces an upper large surface (67) of the main body (41) of the piston (4) and that a peripheral edge section of the holding plate (63), which encompasses said peripheral wall (64), is situated above the upper edge part of the opening (104) in the main body (41) of the piston (4).

11. Equipment according to claim 10, characterized in the diameter (DH) of the peripheral wall (64) of the holding plate (63) is bigger than the diameter (DK) of the main body (59) of the piston rod (5).

12. Equipment according to claim 10, characterized in the length of the pivot (60) is somewhat bigger than the thickness of the piston main body (41), so that an end section of the pivot (60) projects outwardly from the piston main body (41) and that this end section of the pivot (60) is reshaped or widened so that this section of the pivot (60) forms said holding plate or head (63).

13. Equipment according to claim 10, characterized in a diameter (DO) of the interior circular edge (76) of an upper ring wall (71) of the seal (70) corresponds to a diameter (DZ) of the pivot (60), that a diameter of an inner circular edge (77) of a lower ring wall (72) of the seal (70) is bigger than or corresponds to the diameter (DK) of the piston rod (5), that the diameter (DH) of the head (63) is bigger than the diameter (DO), (DK) respectively, so that the outer edge part (64) of a holding head (63) overlaps the inner edge part (76) of the upper wall (71) of a sealing ring (70) and that the interior circular edge (77) of the lower wall (72) of a hollow ring (70) lies in the area of the outer wall of the main body (59) of the piston rod (5).

14. Equipment according to claim 9, characterized in large surfaces (67,68) of the annular main body (41) of the piston (40) are flat, that such a main body (41) of the piston (40) is made of a stiff material, that the outer edge part (44) of the main body (41) of the piston (4) extends continuously over the whole periphery of the main body (41) and that the essentially ring walls (71,72) are shaped as flat rings.

15. Equipment according to claim 14, characterized in a circular and radially situated bulge (75) is formed on the outer side of a bridging wall (73) of the seal (70) and that one surface of this bulge (75) which is extending from the peripheral wall (73) of the seal (70) is rounded or convex.

16. Equipment according to claim 9, characterized in the main body (81) of the piston (80) has a form of a dish or of a flat bowl having a bottom (82) and a wall (83), that the wall (83) of the piston main body (81) stands practically rectangularly to the bottom (82), that the seal (85) shows a lower ring wall (72) and an upper ring wall (86), that the lower ring wall (72) has the shape of a flat ring, that the cross section of the upper ring wall (86) is essentially Z-shaped, that a respective leg (87,88,89) of said Z-shape lies on a respective section of the upper side of a piston main body (81), that the outer edge of the upper ring wall (89) and the outer edge of the lower ring wall (72) are connected together by means of a peripheral wall (79) the outer surface of which is convex.

17. Equipment according to claim 16, characterized in a first or lower leg (87) of the Z-shaped represents a cut through the lower section of the upper ring wall (86) which lies on the upper side of the bottom (82) of the bowl (81), that this lower leg (87) shows in that region, which faces the pivot (60), an already described ring shaped edge (76), that the lower edge part of a connecting leg (88) of the Z-form is connected with the outer edge part of the lower leg (87), that this connection leg (88), which extends practically parallel to the longitudinal axis C, represents a cut through a connecting section of the ring wall (86), that this connecting wall (88) extends parallel to the longitudinal axis C and lies on an inside of the bowl wall (83), that the upper ring wall (89) is connected to the upper edge of the connecting leg (88), which represents a cut through the upper section of the ring wall (86), that the lower leg (87) and this upper wall section (89) of the upper ring wall (85) extend parallel to each other as well as to the bottom (82) of the piston main body (81) and that the upper ring wall section (89) is assigned to the upper front area of the bowl wall (83).

18. Equipment according to claim 9, characterized in the main body (91) of the piston (90) has a form of a dish or of a flat bowl having a bottom (92) and a wall (93), that the wall (93) of a piston main body (91) stands to the bottom (92)

thereof under an angle which is bigger than 90 degrees and smaller than 180 degrees, that this piston main body (91) is surrounded by a hollow sealing ring (95), that the upper and lower walls (71,72) are shaped as flat rings that the outer edges of these walls (71,72) are connected together by means of a peripheral wall (96) which is carried out as a material conglomeration or thickening of this sealing ring (95) and that this thickening (96) has a circle round outer convex surface.

19. Equipment according to patent claim 18, characterized in radial extending cuts (101) are carried out in the outer edge part of the piston main body (41) which are placed along the periphery of the main body (41) in distances of each other, that a segment (102) is placed between neighboring cuts (101), that said segments (102) extend essentially in a radial direction and that the material of the sealing ring (95) lies not only on a large surface of the segments (102) but also in the cuts or gaps (101) between the neighboring segments (102).

20. Equipment according to claim 19, characterized in segments (102) are divided approximately fan shaped on a circular shaped middle section (103) of the piston main body (41), that one of the segment is bent out to one side of the middle section (103) of the piston main body (41) while the neighboring segment is bent out to the opposite side of said middle section (103).

21. Equipment for an adjustment of a length of a support for chairs or tables, having an essentially tubular interior part, having a piston (4) which is movable in the interior part in a fluid tight manner, the piston (4) comprising a main body (41) provided with a seal (70), whereby an opening (104) exists in the middle area of this main body (41) and, the piston (4) further comprising a piston rod (5), one end portion of said piston rod is provided with a circular step, so that a pivot (60) extends from the front end surface (62) of this end portion of the piston rod (5), whereby said pivot (60) is aligned with a longitudinal axis C of the main body (59) of the piston rod (5) and whereby the main body (41) of the piston (4) is put up on said pivot (60), characterized in that the piston (103) shows a stiff insert (120) having a form of a flat ring and that the piston (105) is secured on the piston rod (5) by aid of a spring arrangement, characterized in the main body (121) of the stiff insert (120) which stands practically rectangularly to the longitudinal axis C of the piston rod (5), that the middle part of this insert (120) has an opening (125), so that the insert (120) has an outer edge (122) and an inner edge (123), that the inner edge (123) is provided with tongues (126) which stand away from the interior edge (123) and which are distributed along this interior edge (123), that a respective tongue (126) extends in radial direction with respect to the longitudinal axis C and the respective tongue (126) has the form of a ring sector, that the contour of the outer edge (122) is circular, that outer edge (122) is embedded in the interior of the seal (130), so that the middle part (125) of the insert (120) is free or accessible from one side of the seal (130), and that the end portion (116) of the piston (105) is placed in the springly part (125) of the insert (120).

22. Equipment according to claim 21, characterized in the tongues (126) are bent out from the plane of the main body (121) of the ring (120), that the bending points of the tongues (126) lie in the area of the interior edge (123) of the insert (120), that the tongues are (126) are bent out in same direction from the plane of the ring main body (121)

23. Equipment according to claim 21, characterized in a circular groove (110) is carried out in that end portion of the piston rod (5) to which the piston (105) is assigned, that this groove (110) is placed in a distance from the front surface (112) of the end section of the piston rod (5) and that the free end portion of the tongues (126) lie in this groove (110).

24. Equipment according to claim 23, characterized in the circular groove (110) has an asymmetrical cross section, so that the circular groove (110) comprises a bottom (113) and only one side wall (117), that the bottom (113) of the groove (110) stands under an angle alpha to the longitudinal axis C of the piston rod (5), that this angle alpha is different of 0, that one edge of the sloped extending bottom (113) of the groove (110), which is nearer to the front surface (112) of the piston rod (5), lies in the peripheral surface (114) of the piston rod (5), namely in that one section (116) of the piston rod main body (111) which is between the groove (110) and said front surface (112) of the piston rod (5).

25. Equipment according to claim 24, characterized in a groove side wall (117) stands rectangularly to a groove bottom (113).

26. Equipment according to claim 25, characterized in the diameter D3 between the front edges (129) of two opposite tongues (126) is chosen so that these front edges (129) lie on the bottom (113) of the groove (110) and that bent out tongues (126) form also the angle alpha with the longitudinal axis C of the piston rod (5), so that the side wall (117) of the grooves (110) stand rectangularly to the ground (113) of the groove (110) and lie extensively on the side wall (117) of the groove(110).

27. Equipment according to claim 23, characterized in the circular groove (110) has an U-shaped cross section.

28. Equipment according to claim 21, characterized in the seal (130) has an essentially disk shaped main body (131) having an upper front surface (132) and a lower front surface (133), that a depending (135) is carried out in the lower front surface (133) of a seal main body (131), that a circular or ring shaped indentation (137) is carried out in a cylinder shaped side wall (136) of the deepening (13), that the insert (120) is set in this indentation (137) and that the diameter of said cylinder shaped side wall (136) of this deepening (135) corresponds in the area of the orifice of said deepening (135) to the diameter D2 of the main body (111) of the piston rod (5).

29. Equipment according to claim 28, characterized in the seal main body (131) shows an outer and essentially cylindrical side surface (134), that a circular or annular bulge (141) projects or stands away laterally or in the radial direction from the outer side wall (134) of the seal main body (131), that this bulge (141) is in one piece with the seal main body (131) and that the peripheral part of the bulge (141) has in cross section the form of a segment of a circle.

30. Equipment according to claim 29, characterized in a lip (142) extends from the lower front surface (133) of the seal main body (131), that this lip (142) surrounds the orifice of the deepening (135) in the seal main body (131) and that it lies tightly on the surface (114) of the main body (111) of the piston rod (5).

31. Equipment according to claim 21, characterized in the edge of the end portion of the piston rod (5) is provided with a chamfer (115) and that this chamfer (115) surrounds the front surface (112) of this end section of the piston rod (5).

\* \* \* \* \*